UNITED STATES PATENT OFFICE.

ROBERT S. MILLER, OF WILMINGTON, DELAWARE, ASSIGNOR OF ONE-HALF TO JAMES WILBUR CARRIER, OF SAME PLACE.

COATING COMPOSITION FOR THE COVERING OF STEAM-PIPES.

SPECIFICATION forming part of Letters Patent No. 465,717, dated December 22, 1891.

Application filed March 19, 1891. Serial No. 385,678. (No specimens.)

*To all whom it may concern:*

Be it known that I, ROBERT S. MILLER, of Wilmington, in the county of Newcastle and State of Delaware, have invented a new and Improved Coating Composition for the Coverings of Steam Pipes and Boilers, of which the following is a full, clear, and exact description.

The composition of matter which constitutes this invention is mainly designed to be used as a coating or outside "finish" to various or any special plastic coverings applied in any suitable manner and in one or more layers to the exterior of steam-pipes, boilers, and other articles or surfaces requiring to be made water-tight and generally requiring the temperature of the fluid or vapor to be retained within them. It might also be used as an elastic coating or covering for other purposes.

To make this elastic water-proof coating or covering I take of plaster-of-paris two parts, more or less; feldspar, one part or thereabout, and sifted kaolin, fifteen parts, more or less, and mix the whole with lime or alum water in sufficient quantity to form a paste. Hydraulic cement or lime may be used as a substitute for the plaster-of-paris, and in this case would be the equivalent thereof. Said composition may be applied by a trowel to or on the outside of the plastic composition covering which it is designed to protect or improve—as, for instance, the plastic covering of a steam-pipe or boiler as an outside coating or finish thereto—or it may be used on any article or surface requiring such a finish or coating. When dry, said coating may be rubbed with a cloth to give it a high polish. Applied as an outside coating to a plastic composition beneath, as in the case of steam-pipe and boiler coverings, it will do away with those exterior cracks which are not only unsightly, but deprive the composition covering of much of its value and which often necessitates the use of outside wrappers of canvas, and it will protect and improve or serve to keep more generally intact and free from cracks such under composition or covering, the outside coating formed by my composition being in itself not only adhesive, but elastic. This would not be effected were plaster-of-paris or kaolin used alone for an outside coating, as the same would crack; but my improved composition, when thoroughly made and mixed, is elastic and will contract and expand without cracking. The feldspar not only helps to make the composition elastic, but gives it a sticky and adhesive character, and the composition is water-proof. Said coating, besides being water-proof, saves the expense of putting on canvas and other similar outside coverings, which are not water-proof and which soon become dirty and cannot well be cleaned, whereas my improved coating can be washed clean as often as desired. By taking a high polish, too, the appearance of the coating is greatly improved; but its main advantages are that it is perfectly water-proof and free from cracking with changes of temperature, such as boiler and steam-pipe coverings, for instance, are usually exposed to.

I claim—

The herein-described composition or matter to be used as an outside coating to the coverings of steam-pipes, boilers, and other articles or surfaces, consisting of plaster-of-paris or its equivalent, feldspar, and filtered kaolin mixed with lime or alum water, substantially as set forth.

ROBERT S. MILLER.

Witnesses:
J. W. CARRIER,
ROBT. S. MILLER, Jr.